Oct. 20, 1942.　　　G. A. REHM　　　2,299,559
WATER COOLED FURNACE
Filed Feb. 7, 1941　　　3 Sheets-Sheet 1

Inventor
GUSTAV A. REHM
By Albert G. Blodgett
Attorney

Oct. 20, 1942.    G. A. REHM    2,299,559
WATER COOLED FURNACE
Filed Feb. 7, 1941    3 Sheets-Sheet 3

Inventor
GUSTAV A. REHM
By Albert G. Blidget
Attorney

Patented Oct. 20, 1942

2,299,559

UNITED STATES PATENT OFFICE 2,299,559

WATER COOLED FURNACE

Gustav A. Rehm, Worcester, Mass., assignor to Riley Stoker Corporation, Worcester, Mass., a corporation of Massachusetts Application February 7, 1941, Serial No. 377,869

8 Claims. (Cl. 122—235)

This invention relates to water cooled furnaces, and more particularly to the construction and arrangement of hopper bottom furnaces adapted for the combustion of pulverized coal or similar fuels in suspension.

It has been proposed heretofore to construct the lower portion of a furnace in the form of a V in longitudinal cross-section, the front and rear walls of the furnace bottom converging downwardly toward a transverse slot or opening through which the fuel ash is discharged. The side walls of such furnaces are usually provided with upright water wall tubes, but it has not been considered feasible to extend these tubes downwardly into the V-shaped portion of the furnace, primarily because of the difficulties involved in supplying water to the tubes. Consequently, the side walls of the hopper bottom have been constructed of brickwork without water cooling, and this has resulted in excessive air infiltration and high maintenance expense.

It is accordingly one object of the invention to provide a hopper bottom furnace having simple and effective means for water cooling the side walls thereof.

It is a further object of the invention to provide a hopper bottom furnace having upright water wall tubes at the sides thereof extending downwardly into the lower portion of the furnace, with simple and advantageous means for supplying water to the lower ends of the tubes.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a longitudinal sectional view of the lower portion of a water cooled furnace, the section being taken on the line 1—1 of Fig. 2;

Figure 1:
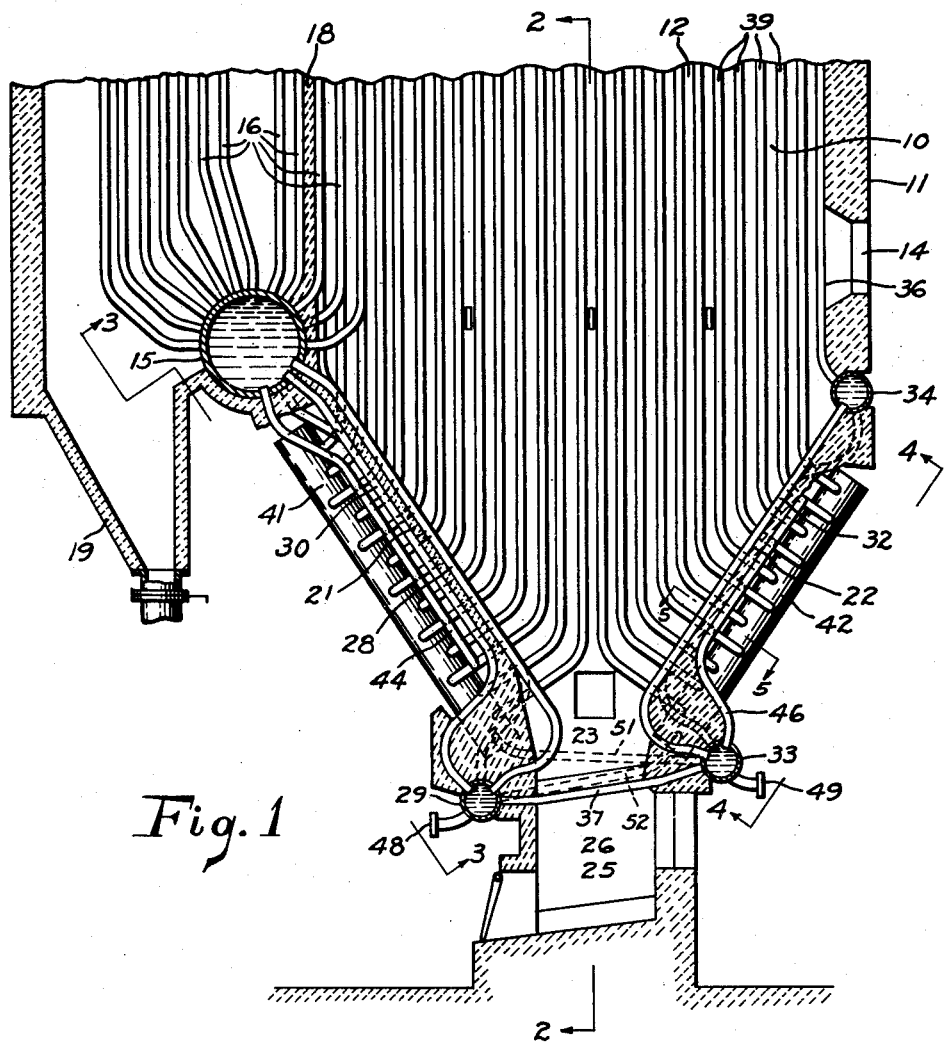

The embodiment illustrated comprises a furnace or combustion chamber 10 having a front wall 11 and two side walls 12, the front wall having an opening 14 therein for the introduction of a suitable fuel, such as pulverized coal, which is burned in suspension. At the rear of the combustion chamber there is mounted a transverse horizontal water drum 15 from which a bank of convection water tubes 16 extends upwardly. An upright baffle 18 is mounted in the front portion of the tube bank 16 to deflect the furnace gases upwardly in a well-known manner. The usual soot hopper 19 is provided behind the drum 15 to collect particles of soot or ash which may be carried rearwardly over the top of the baffle 18.

The lower portion of the combustion chamber 10 is shaped to provide a hopper bottom which will collect and discharge the ash which is deposited from the burning fuel. For this purpose a rear bottom wall 21 slopes downwardly and forwardly from the water drum 15, and a front bottom wall 22 slopes downwardly and rearwardly from the lower margin of the front wall 11. The lower edges of the sloping walls 21 and 22 are separated by a comparatively narrow transverse slot 23 through which the ashes may drop into a series of pockets 25 separated by upright piers 26. The ashes may be removed from these pockets by any suitable means. The bottom walls 21 and 22 meet the side walls 12 at right angles.

The upper surface of the rear wall 21 of the hopper is protected and cooled by mean of a row of inclined water tubes 28 which are connected at their lower ends to a transverse horizontal header 29 located adjacent the lower edge of the wall. Alternate tubes in this row are connected at their upper ends to the water drum 15, while the remaining tubes extend upwardly in front of the baffle 18 and among the tubes of the bank 16. In order that an adequate supply of water may be delivered to the header 29, this header is connected to the water drum 15 by means of a row of water tubes 30 located slightly to the rear of the tubes 28. The intermediate portions of the tubes 28 and 30 are substantially parallel, whereas their end portions are bent to connect with the adjacent water compartments.

Figure 2:
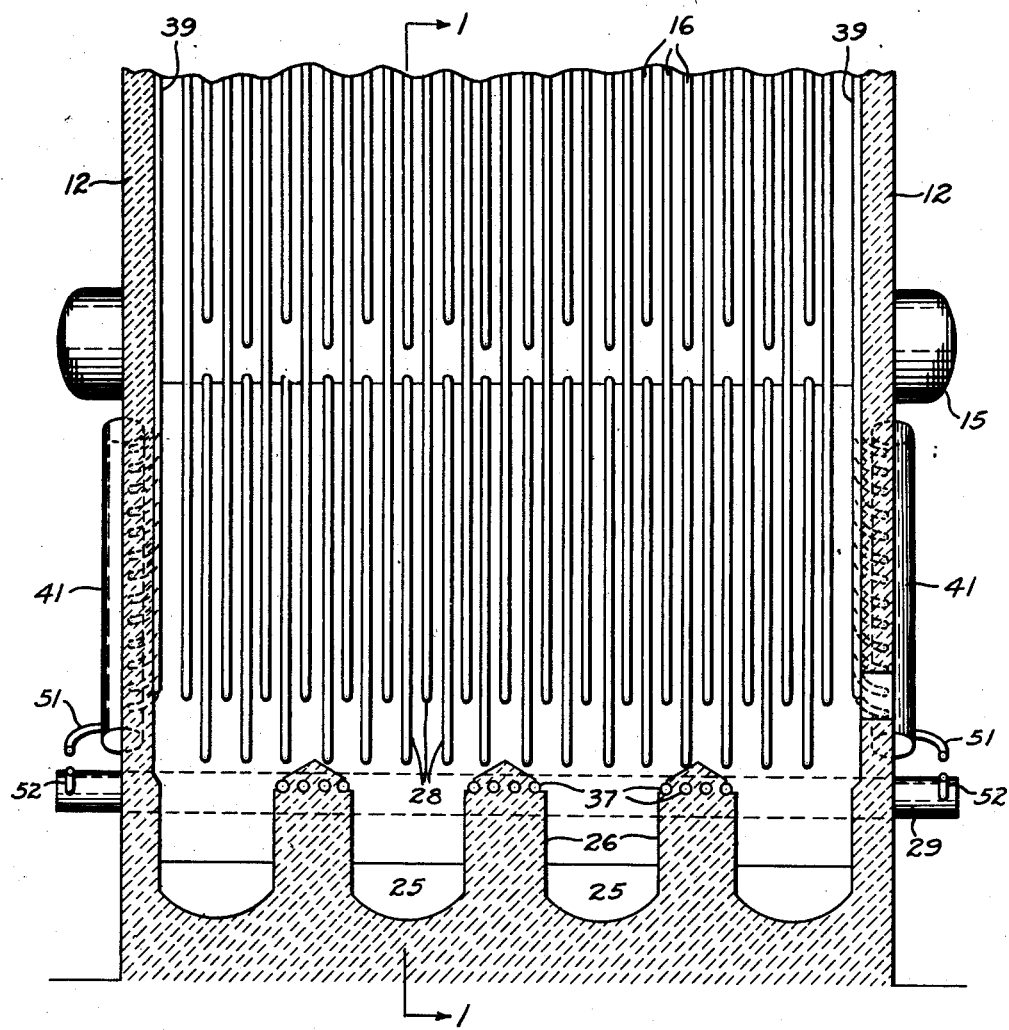
Fig. 2 is a section on the line 2—2 of Fig. 1.

The upper surface of the front wall 22 of the hopper is protected and cooled by means of a row of inclined water tubes 32 which are connected at their lower ends to a transverse horizontal header 33 located adjacent the lower edge of the wall and at a slightly higher elevation than the header 29. These tubes 32 are connected at their upper ends to a transverse horizontal header 34 located at the junction of the wall 22 with the front wall 11 of the furnace. Water tubes 36 extend upwardly from the header 34 and along the rear face of the wall 11, these tubes being bent laterally wherever necessary to avoid interference with the burner opening 14, as will be understood. The headers 29 and 33 are connected by water tubes 37 which slope upwardly and forwardly at a slight angle. These tubes 37 are arranged in several groups which are embedded in the upper portions of the piers 26, as shown particularly in Fig. 2.

The side walls 12 of the combustion chamber are cooled and protected by means of upright water wall tubes 39 which, contrary to the prior practice, extend downwardly into the hopper bottom portion of the furnace, as shown particularly in Fig. 1. In this manner the side walls are water cooled as far down as the ash discharge slot 23, and they can be formed of tile and insulating material with an outer metal casing which will minimize heat radiation and air infiltration. This greatly decreases the cost of furnace maintenance and increases the combustion efficiency. The water wall tubes 39 at each side of the furnace are arranged with their axes in a common vertical plane.

Figure 5:
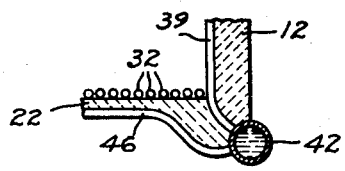
Fig. 5 is a section on the line 5—5 of Fig. 1.

A new and highly advantageous construction is provided to supply water to the lower ends of the water wall tubes 39. Adjacent the junction of the rear bottom wall 21 with each side wall 12 there is mounted a header 41 which slopes substantially parallel with the wall 21. Adjacent the junction of the front bottom wall 22 with each side wall 12 there is mounted a header 42 which slopes substantially parallel with the wall 22. The headers 41 and 42 are somewhat offset outwardly from the plane of the adjacent water wall tubes 39 and parallel with this plane, and the lower ends of the tubes are connected to the headers, the tubes in the rear portion of the furnace being connected with the rear headers 41, and the tubes in the front portion of the furnace being connected to the front headers 42. Preferably each tube 39 is bent in a plane parallel with the side wall to bring the tube into a plane perpendicular to the corresponding header 41 or 42, as the case may be, and the tube is also bent outwardly in this perpendicular plane so that it may enter the offset header radially, as shown particularly in Fig. 5. This double bend construction is capable of flexing as may be required to prevent excessive stresses in the tubes and resultant buckling thereof produced by expansion and contraction of the tubes with changes in temperature. Moreover, because of the inclination of the headers the lower ends of the tubes, which enter the headers, can be spaced farther apart than the upright portions of the tubes. This makes it possible to have close tube spacing along the side walls, which is usually desirable, and yet maintain a wider spacing at the headers to ensure adequate ligament strength.

Figure 3:
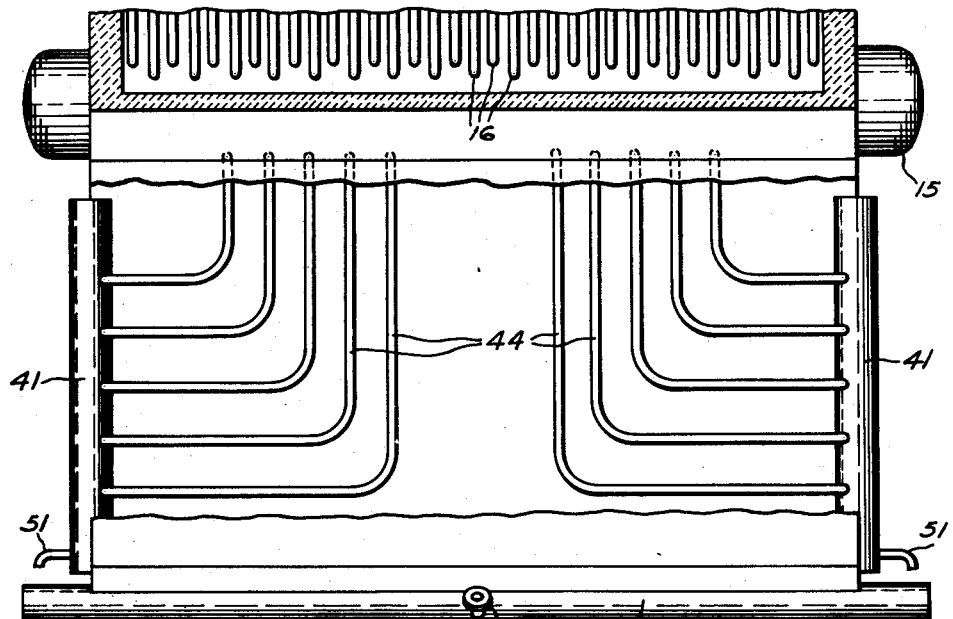
Fig. 3 is a view taken on the line 3—3 of Fig. 1.
Figure 4:
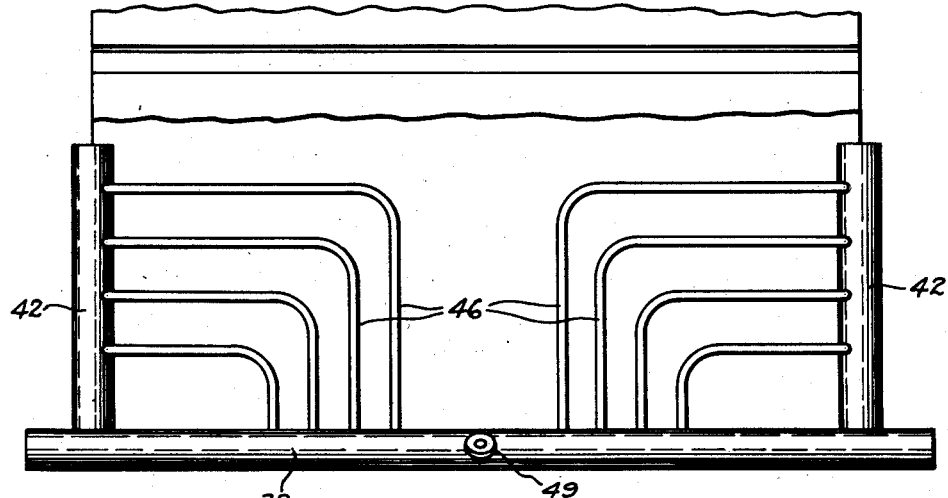
Fig. 4 is a view taken on the line 4—4 of Fig. 1.

Water is supplied to the two rear sloping headers 41 from the water drum 15 by means of a group of downcomer tubes 44, which are preferably L-shaped, as shown particularly in Fig. 3. Except for the bent portions at their ends, which facilitate connection with the drum and headers, these tubes are located in a plane substantially parallel with the sloping wall 21. Water is supplied to the two front sloping headers 42 from the transverse header 33 by means of a group of tubes 46, which are preferably L-shaped, as shown particularly in Fig. 4. Except for the bent portions at their ends, which facilitate connection with the headers, these tubes are located in a plane substantially parallel with the sloping wall 22. With this arrangement of the tubes 44 and 46, it is a comparatively simple matter to cover them with insulating material and a metal casing, thus forming a substantially air-tight setting. This material has been for the most part omitted from the drawings in order that the shape of the tubes might be clearly shown.

The transverse headers 29 and 33 are preferably provided with blow-off nozzles 48 and 49 respectively. Drain tubes 51 extend from the lower ends of the rear inclined headers 41 to the ends of the header 33, and drain tubes 52 extend from the lower ends of the front inclined headers 42 to the ends of the header 29. With this construction any sediment which collects in the headers can be readily blown off through the nozzles, or the entire system can be drained when desired.

It will now be apparent that in the operation of the invention the water tubes 28, 32, 36 and 39 will absorb heat which is radiated from the combustion flame, and some of the water in these tubes will be changed to steam. This will produce an upward flow of the steam and water mixture in these tubes. Water will flow downwardly from the drum 15 through the tubes 30 to the header 29, and thence forwardly through the tubes 37 to the header 33. Water will enter the lower ends of the tubes 28 directly from the header 29, and water will enter the lower ends of the tubes 32 directly from the header 33. Water from the tubes 32 will be delivered to the header 34, whence it will enter the tubes 36. Water will flow from the water drum 15 through the tubes 44 to the rear inclined headers 41, whence it will enter the lower ends of the side water wall tubes 39 in the rear portion of the furnace. Water will also flow from the header 33 through the tubes 46 to the front inclined headers 42, whence it will enter the lower ends of the side water wall tubes 39 in the front portion of the furnace. Thus an adequate supply of water will be provided for all of the heat exposed tubes, and rapid circulation will be ensured.

The construction is comparatively simple and inexpensive. The side walls are water cooled substantially to the bottom of the furnace hopper. All downcomers are formed by means of tubes rolled into headers or the boiler drum, and no large pipes or flanged connections are required. Moreover, all the tubes are so arranged that they in effect form parts of the adjacent walls, and they can be insulated and encased in a simple manner.

Having thus described my invention, what I claim as new and desire to secure by Letters Patent is:

1. A water cooled furnace comprising two opposed upright side walls, a transverse horizontal water drum at the rear of the furnace, a bottom wall sloping downwardly and forwardly in front of the drum, downwardly and forwardly sloping headers located adjacent the junctions of the bottom wall with the side walls, upright water wall tubes associated with the side walls, the lower portions of the tubes being bent rearwardly and connected to the headers, a transverse horizontal header located adjacent the lower margin of the bottom wall, a row of inclined water tubes extending from the horizontal header upwardly along the bottom wall to cool the same, a row of downcomer tubes connecting the water drum with the horizontal header, and means to supply water from the water drum to the sloping headers.

2. A water cooled furnace comprising two opposed upright side walls, a transverse horizontal water drum at the rear of the furnace, a bottom wall sloping downwardly and forwardly in front of the drum, downwardly and forwardly sloping headers located adjacent the junctions of the bottom wall with the side walls, upright water wall tubes associated with the side walls, the lower portions of the tubes being bent rearwardly and connected to the headers, a transverse horizontal header located adjacent the lower margin of the bottom wall, a row of inclined water tubes extending from the horizontal header upwardly along the bottom wall to cool the same, a row of downcomer tubes connecting the water drum with the horizontal header, and substantially L-shaped tubes located closely beneath the bottom wall and connecting the water drum with the sloping headers.

3. A water cooled furnace comprising two opposed upright side walls, a transverse horizontal water drum at the rear of the furnace, a bottom wall sloping downwardly and forwardly in front of the drum, downwardly and forwardly sloping headers located adjacent the junctions of the bottom wall with the side walls, upright water wall tubes associated with the side walls, the lower portions of the tubes being bent rearwardly and connected to the headers, a transverse horizontal header located adjacent the lower margin of the bottom wall, a row of inclined water tubes extending from the horizontal header upwardly along the bottom wall to cool the same, a row of downcomer tubes connecting the water drum with the horizontal header, and substantially L-shaped tubes located beneath the said downcomer tubes and connecting the water drum with the sloping headers.

4. A water cooled furnace comprising two opposed upright side walls, a front wall, a transverse horizontal water drum at the rear of the furnace, a rear bottom wall sloping downwardly and forwardly in front of the drum, a front bottom wall sloping downwardly and rearwardly from the front wall, the adjacent lower edges of the two bottom walls being separated by a transverse slot, rear headers sloping downwardly and forwardly adjacent the junctions of the rear bottom wall with the side walls, front headers sloping downwardly and rearwardly adjacent the junctions of the front bottom wall with the side walls, upright water wall tubes associated with the side walls, the lower ends of the water wall tubes being connected to the sloping headers, a rear transverse horizontal header located adjacent the lower margin of the rear bottom wall, a row of inclined water tubes extending from the rear horizontal header upwardly along the rear bottom wall to cool the same, a front transverse horizontal header located adjacent the lower margin of the front bottom wall, a row of inclined water tubes extending from the front horizontal header upwardly along the front bottom wall to cool the same, means to supply water from the water drum to the rear horizontal header and the rear sloping headers, means to supply water from the rear horizontal header to the front horizontal header, and means to supply water from the front horizontal header to the front sloping headers.

5. A water cooled furnace comprising two opposed upright side walls, a front wall, a transverse horizontal water drum at the rear of the furnace, a rear bottom wall sloping downwardly and forwardly in front of the drum, a front bottom wall sloping downwardly and rearwardly from the front wall, the adjacent lower edges of the two bottom walls being separated by a transverse slot, rear headers sloping downwardly and forwardly adjacent the junctions of the rear bottom wall with the side walls, front headers sloping downwardly and rearwardly adjacent the junctions of the front bottom wall with the side walls, upright water wall tubes associated with the side walls, the lower ends of the water wall tubes being connected to the sloping headers, a rear transverse horizontal header located adjacent the lower margin of the rear bottom wall, a row of inclined water tubes extending from the rear horizontal header upwardly along the rear bottom wall to cool the same, a front transverse horizontal header located adjacent the lower margin of the front bottom wall, a row of inclined water tubes extending from the front horizontal header upwardly along the front bottom wall to cool the same, a row of downcomer tubes connecting the water drum with the rear horizontal header, tubes connecting the water drum with the rear sloping headers, tubes connecting the rear horizontal header with the front horizontal header, and substantially L-shaped tubes connecting the front horizontal header with the front sloping headers.

6. A water cooled furnace comprising two opposed upright side walls, a front wall, a transverse horizontal water drum at the rear of the furnace, a rear bottom wall sloping downwardly and forwardly in front of the drum, a front bottom wall sloping downwardly and rearwardly from the front wall, the adjacent lower edges of the two bottom walls being separated by a transverse slot, rear headers sloping downwardly and forwardly adjacent the junctions of the rear bottom wall with the side walls, front headers sloping downwardly and rearwardly adjacent the junctions of the front bottom wall with the side walls, upright water wall tubes associated with the side walls, the lower ends of the water wall tubes being connected to the sloping headers, a rear transverse horizontal header located adjacent the lower margin of the rear bottom wall, a row of inclined water tubes extending from the rear horizontal header upwardly along the rear bottom wall to cool the same, a front transverse horizontal header located adjacent the lower margin of the front bottom wall, a row of inclined water tubes extending from the front horizontal header upwardly along the front bottom wall to cool the same, a row of downcomer tubes connecting the water drum with the rear horizontal header, substantially L-shaped tubes connecting the water drum with the rear sloping headers, tubes connecting the rear horizontal header with the front horizontal header, and substantially L-shaped tubes connecting the front horizontal header with the front sloping headers.

7. A water cooled furnace comprising two opposed upright side walls, a front wall, a transverse horizontal water drum at the rear of the furnace, a rear bottom wall sloping downwardly and forwardly in front of the drum, a front bottom wall sloping downwardly and rearwardly from the front wall, the adjacent lower edges of the two bottom walls being separated by a transverse slot, rear headers sloping downwardly and forwardly adjacent the junctions of the rear bottom wall with the side walls, front headers sloping downwardly and rearwardly adjacent the junctions of the front bottom wall with the side walls, upright water wall tubes associated with the side walls, the lower ends of the water wall tubes being connected to the sloping headers, a rear transverse horizontal header located adjacent the lower margin of the rear bottom wall, a row of inclined water tubes extending from the rear horizontal header upwardly along the rear bottom wall to cool the same, a front transverse horizontal header located adjacent the lower margin of the front bottom wall, a row of inclined water tubes extending from the front horizontal header upwardly along the front bottom wall to cool the same, a row of downcomer tubes connecting the water drum with the rear horizontal header, substantially L-shaped tubes located beneath the said downcomer tubes and connecting the water drum with the rear sloping headers, tubes connecting the rear horizontal header with the front horizontal header, and substantially L-shaped tubes connecting the front horizontal header with the front sloping headers.

8. A water cooled furnace as covered by claim 7, in which the front horizontal header is located at a higher elevation than the rear horizontal header, and the tubes connecting these headers slope upwardly and forwardly.

GUSTAV A. REHM.